(12) United States Patent
Wang et al.

(10) Patent No.: US 10,095,673 B2
(45) Date of Patent: Oct. 9, 2018

(54) GENERATING CANDIDATE LOGOGRAMS

(71) Applicant: LENOVO (Singapore) PTE, LTD., New Tech Park (SG)

(72) Inventors: Song Wang, Cary, NC (US); Jian Li, Chapel Hill, NC (US); Ming Qian, Cary, NC (US); Bradley Park Strazisar, Cary, NC (US); Jianbang Zhang, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 145 days.

(21) Appl. No.: 14/543,710

(22) Filed: Nov. 17, 2014

(65) Prior Publication Data
US 2016/0140094 A1 May 19, 2016

(51) Int. Cl.
*G06F 17/00* (2006.01)
*G06F 17/24* (2006.01)
*G06F 17/22* (2006.01)
*G06T 11/20* (2006.01)

(52) U.S. Cl.
CPC .......... *G06F 17/24* (2013.01); *G06F 17/2223* (2013.01); *G06T 11/203* (2013.01)

(58) Field of Classification Search
CPC .............................. G06F 3/018; G06F 3/04883
See application file for complete search history.

(56) References Cited

U.S. PATENT DOCUMENTS

| | | | |
|---|---|---|---|
| 4,758,979 A | 7/1988 | Chiao-Yueh | |
| 4,829,583 A * | 5/1989 | Monroe | B41J 3/01 382/182 |
| 5,926,566 A * | 7/1999 | Wang | G06F 3/018 382/185 |
| 6,054,941 A * | 4/2000 | Chen | G06F 3/018 341/22 |
| 6,389,166 B1 * | 5/2002 | Chang | G06K 9/222 382/188 |
| 6,903,723 B1 * | 6/2005 | Forest | A61F 4/00 345/157 |
| 8,677,237 B2 * | 3/2014 | Li | G06F 3/04883 715/263 |
| 9,274,609 B2 * | 3/2016 | Xie | G06F 3/018 |
| 2004/0239534 A1 * | 12/2004 | Kushler | G06F 3/018 341/28 |
| 2005/0052406 A1 * | 3/2005 | Stephanick | G06F 3/0236 345/156 |
| 2011/0006929 A1 * | 1/2011 | Fux | G06F 3/018 341/24 |
| 2014/0022180 A1 * | 1/2014 | Yan | G06F 3/018 345/171 |
| 2014/0361983 A1 * | 12/2014 | Dolfing | G06F 3/04883 345/156 |

FOREIGN PATENT DOCUMENTS

| | | |
|---|---|---|
| CN | 1096110 A | 12/1994 |
| CN | 1622121 A | 6/2005 |

(Continued)

*Primary Examiner* — Amelia Tapp
(74) *Attorney, Agent, or Firm* — Kunzler, PC

(57) ABSTRACT

For generating candidate logograms, code recognizes one or more strokes of the logogram input. The code further generates one or more candidate logograms with strokes matching the logogram input strokes.

7 Claims, 14 Drawing Sheets

(56) References Cited

FOREIGN PATENT DOCUMENTS

| | | | |
|---|---|---|---|
| CN | 101276249 | A | 10/2008 |
| CN | 102221976 | A | 10/2011 |
| CN | 102360265 | A | 2/2012 |
| CN | 102467319 | A | 5/2012 |
| CN | 103455264 | A | 12/2013 |
| CN | 104699260 | A | 6/2015 |
| JP | 60217477 | A | 10/1985 |

* cited by examiner

205

| Logogram Index 210 |
|---|
| Logogram Radical 215 |
| Frequency 220 |
| Combinations 230 |
| Topology 265 |
| Stroke 225 |
| Stroke 225 |

| Stroke 225 |
|---|

260

225

| Stroke Index 260 |
| Stroke Order 235 |
| Stroke Direction 240 |
| Stroke Shape 245 |
| Stroke Length 250 |
| Stroke Position 255 |

US 10,095,673 B2

GENERATING CANDIDATE LOGOGRAMS

FIELD

The subject matter disclosed herein relates to logograms and more particularly relates to generating candidate logograms.

BACKGROUND

Description of the Related Art

Logograms such as Chinese characters, Japanese characters, Korean characters, and the like are often generated from stroke inputs, phonetic spellings, and spoken inputs.

BRIEF SUMMARY

An apparatus for generating candidate logograms is disclosed. The apparatus includes a graphical input, a display, a processor, and a memory. The graphical input that accepts a logogram input. The display displays the logogram input. The memory stores code executable by the processor. The code recognizes one or more strokes of the logogram input from the display. The code further generates one or more candidate logograms with strokes matching the logogram input strokes. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
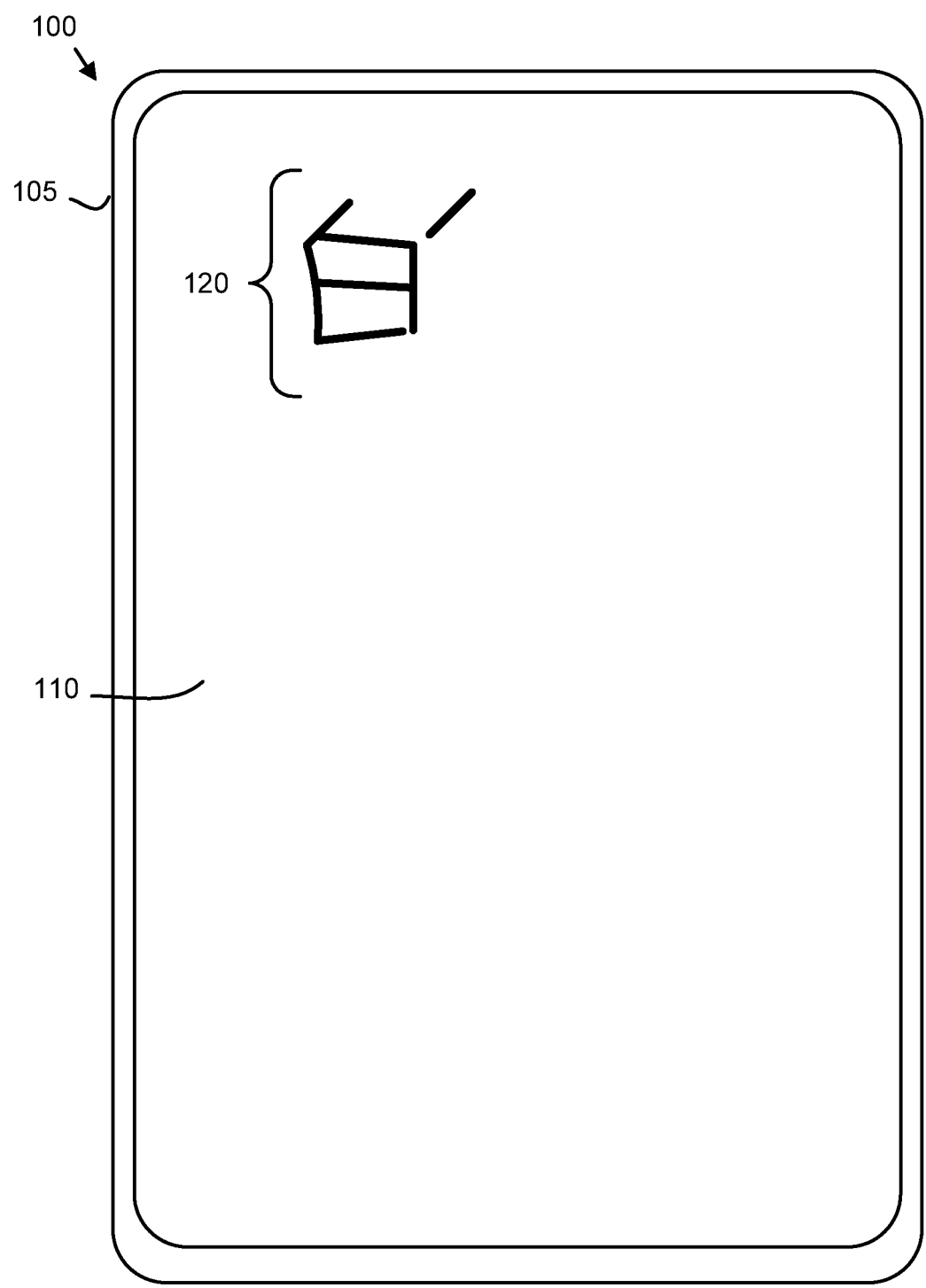
FIG. 1A is a front view drawing illustrating one embodiment of an electronic device with logogram input.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a front view drawing illustrating one embodiment of an electronic device 100 with logogram input 120. The electronic device 100 may be a mobile telephone, a tablet computer, a laptop computer, computer workstation, or the like. The electronic device 100 may include a graphical input 105 that accepts the logogram input 120. In addition, electronic device 100 may include a display 110 that displays the logogram input 120. The logogram input 120 may be entered into the graphical input 105 with a stylus, a finger, or the like.

A user may be uncertain how to render a desired logogram with the logogram input 120. As a result, in the past the user was unable to complete the entry of the desired logogram. The embodiments described herein recognize one or more strokes of a logogram input 120 and generate one or more candidate logograms with strokes matching the logogram input strokes. As a result, the embodiments simplify the entry of logograms on the electronic device 105.

Figure 1B:
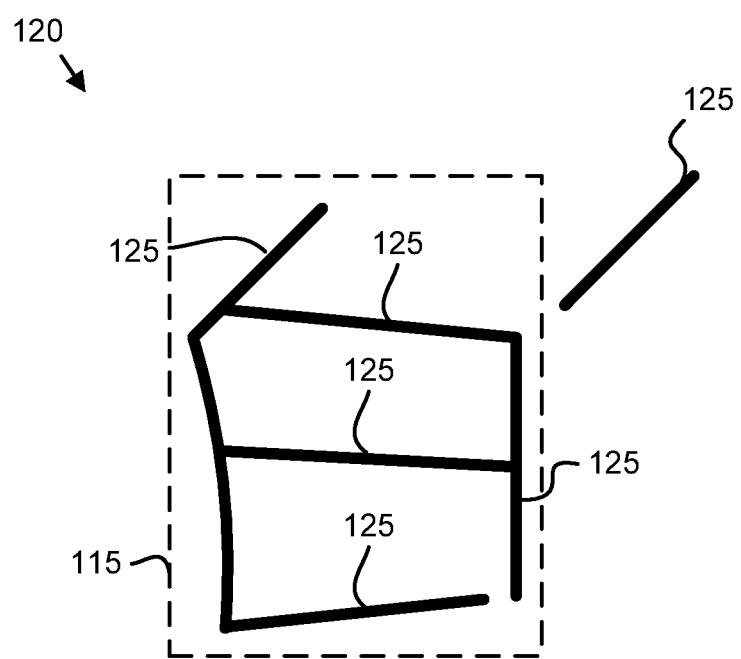
FIG. 1B is a drawing illustrating one embodiment of logogram input.

FIG. 1B is a drawing illustrating one embodiment of logogram input 120. The logogram input 120 includes a plurality of handwritten strokes 125. One or more handwritten strokes 125 may form a handwritten logogram radical 115. Other handwritten strokes 125 may not be part of the handwritten logogram radical 115

Figure 2A:
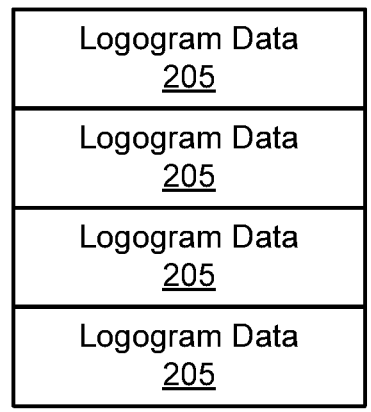
FIG. 2A is a schematic block diagram illustrating one embodiment of a logogram database.

FIG. 2A is a schematic block diagram illustrating one embodiment of a logogram database 200. The logogram database 200 may be organized as a data structure in a memory. The logogram database 200 may include logogram data 205 for a plurality of logograms. For simplicity, four elements of logogram data 205 are shown, but the logogram database 200 may include any number of elements.

Figure 2B:
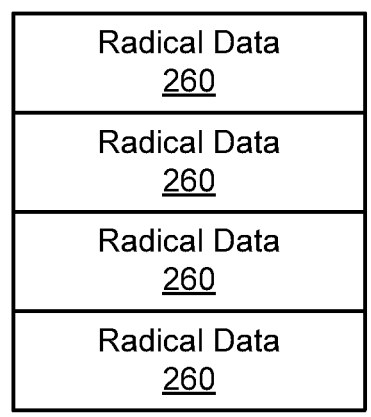
FIG. 2B is a schematic block diagram illustrating one embodiment of a radical database.

FIG. 2B is a schematic block diagram illustrating one embodiment of a radical database 201. The radical database 201 may be organized as a data structure in the memory. The radical database 201 may include radical data 260 for a plurality of logogram radicals. For simplicity, four elements of radical data 260 are shown, but the radical database 201 may include any number of elements.

Figure 2C:
FIG. 2C is a schematic block diagram illustrating one embodiment of logogram data.
Figure 2C:

FIG. 2C is a schematic block diagram illustrating one embodiment of logogram data 205. The logogram data 205 may be organized as a data structure in the memory. In the depicted embodiment, the logogram data 205 includes a logogram index 210, a logogram radical 215, a frequency 220, combinations 230, topologies 265, and one or more strokes 225.

The logogram index 210 may uniquely identify a logogram. The logogram index 210 may be a Unicode value for the logogram. The logogram radicals 215 may identify the radical of the logogram.

The frequency 220 may record a frequency of use for the logogram in communications. The frequency 220 may be for a group of users and/or for a type of use. For example, the frequency 220 may be for employees of the business, residents of a geographic area, email communications, and the like. Alternatively, the frequency 220 may be for a specified user.

The combinations 230 may identify other logograms that the logogram is frequently used in combination with. In addition, the combinations 230 may record a pairing frequency for each other logograms that the logogram is used in combination with.

In one embodiment, the topology 265 indicates a placement of the logogram radical 215 relative to the rest of the logogram. In addition, the topology 265 may indicate a placement of other logogram elements relative to the rest of the logogram.

The strokes 225 may describe written strokes 125. Each logogram may comprise one or more strokes 225. The strokes 225 are described in more detail in FIG. 2E.

Figure 2D:
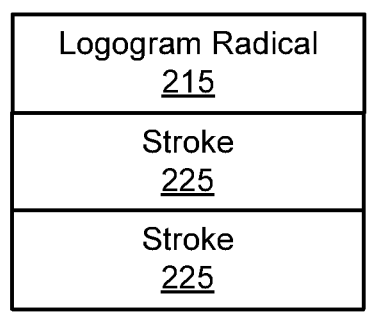
FIG. 2D is a schematic block diagram illustrating one embodiment of radical data.
Figure 2D:
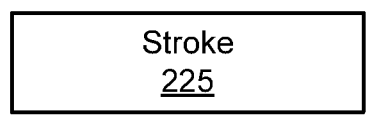

FIG. 2D is a schematic block diagram illustrating one embodiment of radical data 260. The radical data 260 may be organized as a data structure in the memory. In the depicted embodiment, the radical data 260 includes a logogram radical 215 and one or more strokes 225. The logogram radicals 215 uniquely identifies a written logogram radical 115. The strokes 225 describe the written strokes 125 of the written logogram radical 115. The strokes 225 are described in more detail in FIG. 2E.

Figure 2E:
FIG. 2E is a schematic block diagram illustrating one embodiment of stroke data.

FIG. 2E is a schematic block diagram illustrating one embodiment of a stroke 225. The stroke 225 may be organized as a data structure in the memory. The stroke 225 describes a written stroke 125. In the depicted embodiment, the stroke 225 includes a stroke index 260, a stroke order 235, a stroke direction 240, the stroke shape 245, a stroke length 250, and a stroke position 255.

The stroke index 260 may uniquely identify the stroke 225. In one embodiment, the stroke index 260 identifies one stroke 225 of logogram data 205, one stroke 225 of radical data 260, and/or one handwritten stroke 125 of the logogram input 120. Alternatively, the stroke index 260 may identify a handwritten stroke 125 that is common to a plurality of logograms. For example, the stroke index 260 may identify a vertical stroke.

The stroke order 235 may identify the order in which the stroke 225 is written as part of logogram input 120 and/or as part of a handwritten logogram radical 115 of the logogram input 120. For example, the stroke order 235 may identify a stroke as a first stroke of the logogram input 120.

The stroke direction 240 may indicate the direction for writing the handwritten stroke 125. For example, the stroke direction 240 may be left to right, top to bottom, upper right to lower left, upper left to lower right, left to right then top to bottom, and the like.

The stroke shape 245 may describe the shape of the handwritten stroke 125. The stroke length 250 may describe the length of the handwritten stroke 125. The stroke length 225 may be relative to a normalized logogram size. The stroke position 255 may be a topological position of the stroke 225 within a normalized logogram.

Figure 3A:
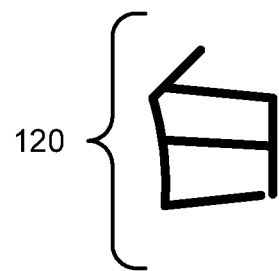
FIG. 3A is a drawing illustrating one embodiment of logogram input.

FIG. 3A is a drawing illustrating one embodiment of logogram input 120. The user may enter the logogram input 120 when attempting to enter a logogram to the electronic device 100.

Figure 3B:
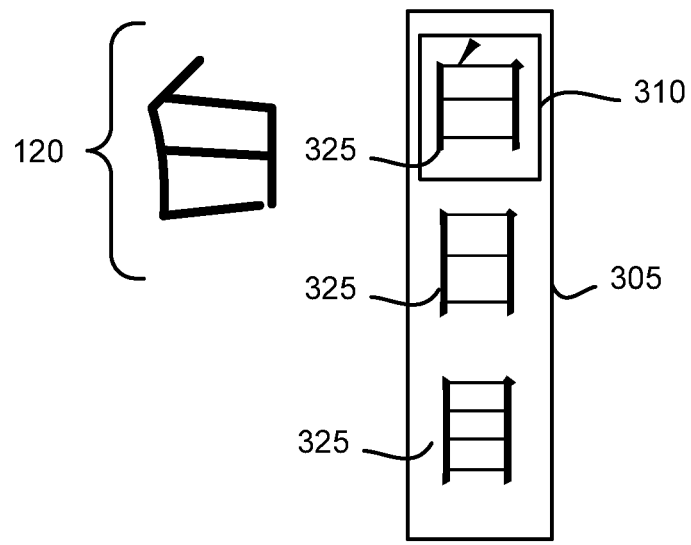
FIG. 3B is a drawing illustrating one embodiment of logogram input with candidate logogram radicals.

FIG. 3B is a drawing illustrating one embodiment of logogram input 120 with a radical list 305 of candidate logogram radicals 325. In the depicted embodiment, first handwritten strokes 125 of the logogram input 120 of FIG. 3A are recognized as potential logogram input radicals. In response to the logogram input radical, one or more candidate logograms 325 are displayed in the radical list 305. Each of the candidate logogram radicals may have logogram radicals 215 that match the logogram input radical. In addition, the electronic device 100 may receive a selection 310 of one of the candidate logogram radicals 325 as the selected logogram input radical.

Figure 3C:
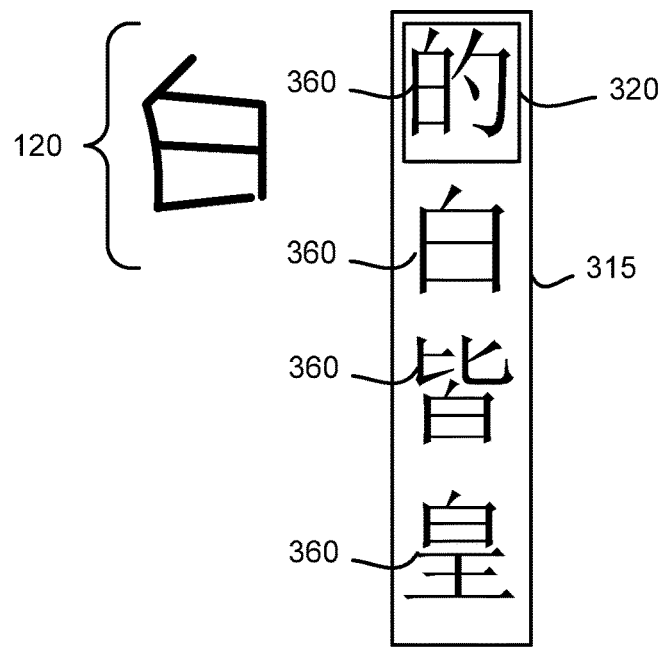
FIG. 3C is a drawing illustrating one embodiment of logogram input with candidate logograms.

FIG. 3C is a drawing illustrating one embodiment of logogram input 120 with candidate logograms 360. In the depicted embodiment, a logogram input radical is recognized from the one or more first strokes of the logogram input 120. One or more candidate logograms 360 are generated and displayed in a logogram list 315. In one embodiment, the radical data 260 of the logogram radicals 115 of the candidate logograms 260 match the logogram input radical of the logogram input 120. The electronic device 100 may receive a selection 320 of a candidate logogram 360. The selected candidate logogram 320 may be entered into the electronic device 100.

Figure 3D:
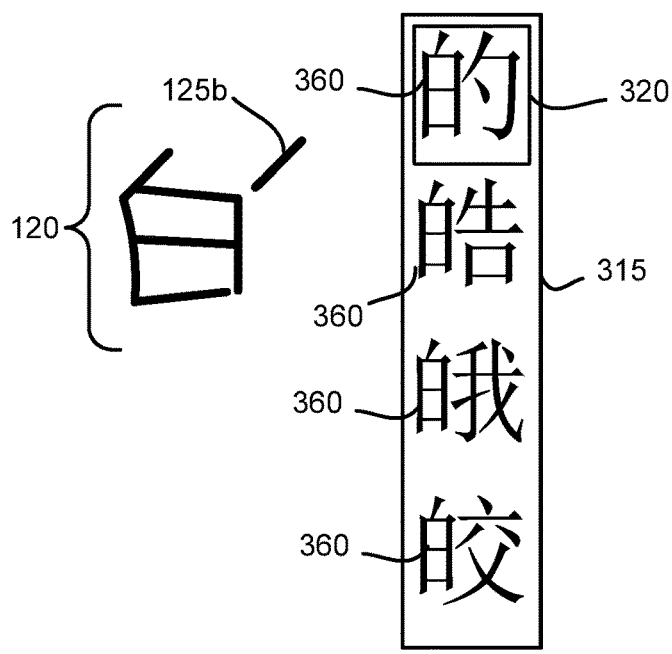
FIG. 3D is a drawing illustrating one alternate embodiment of logogram input with candidate logograms.

FIG. 3D is a drawing illustrating one alternate embodiment of logogram input 120 with candidate logograms 360. In the depicted embodiment, a logogram input radical is recognized from the one or more first strokes of the logogram input 120. One or more candidate logograms 360 are generated and displayed in a logogram list 315. In one embodiment, the logogram radicals 115 of the candidate logograms 360 match the logogram input radical and one or more second strokes 225 of second written strokes 125*b* of the logogram input 120.

Figure 3E:
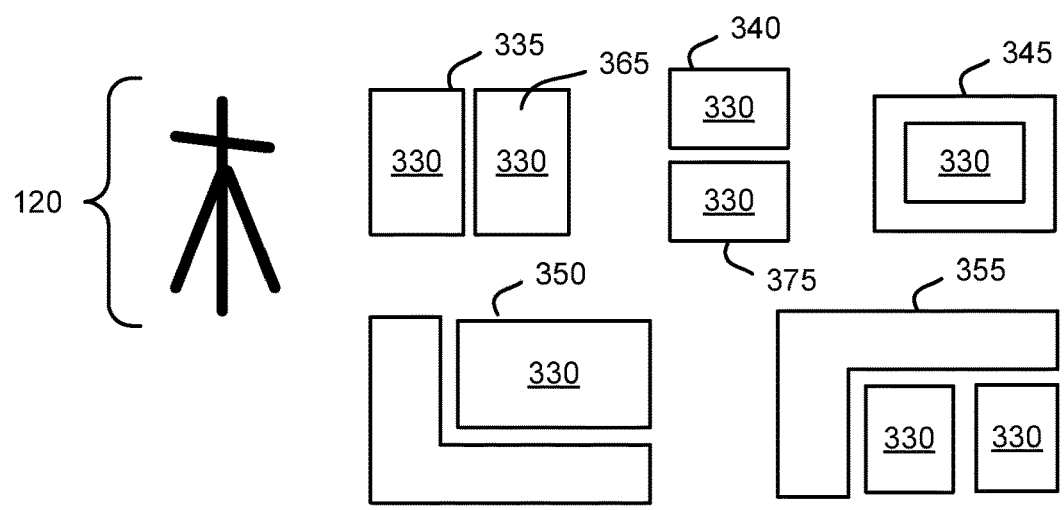
FIG. 3E is a drawing illustrating one embodiment of logogram input with topology indications.

FIG. 3E is a drawing illustrating one embodiment of logogram input 120 with topology indications 330. In the depicted embodiment, a plurality of topology indications 330 are displayed in response to one or more strokes of the logogram input 120. Each of the plurality of topology indications 330 indicate a potential location of the logogram input 120 relative to the rest of the logogram. In the depicted embodiment, the topology indications 330 include input on the left 335, input on the right 365, input on the top 340, input on the bottom 375, input in the center 345, input in the upper right 350, and input in the lower right 355. The input may be a handwritten radical 115. A user may select a topology indication 330 where the user believes the logogram input 120 should be placed within the logogram.

Figure 3F:
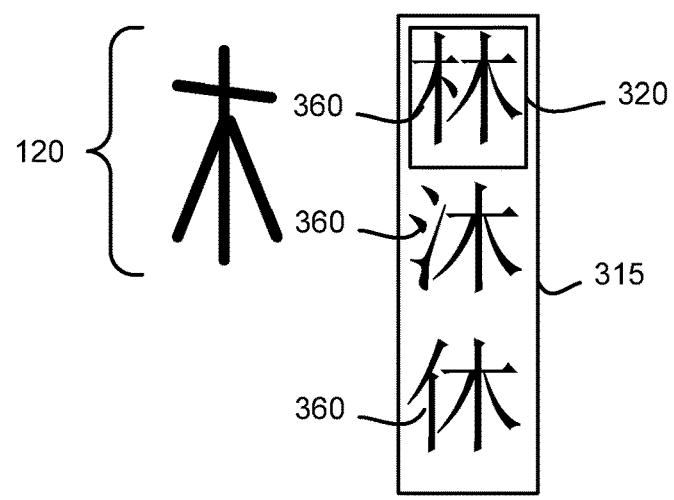
FIG. 3F is a drawing illustrating one embodiment of logogram input with candidate logograms.

FIG. 3F is a drawing illustrating one embodiment of logogram input 120 with logogram candidates 360. In the depicted embodiment, a logogram list 315 is displayed in response to the logogram input 120 and a topology indication 330. The candidate logograms 360 may have strokes 225 matching the handwritten strokes 125 and topologies 265 matching the topology indication 330.

Figure 4:
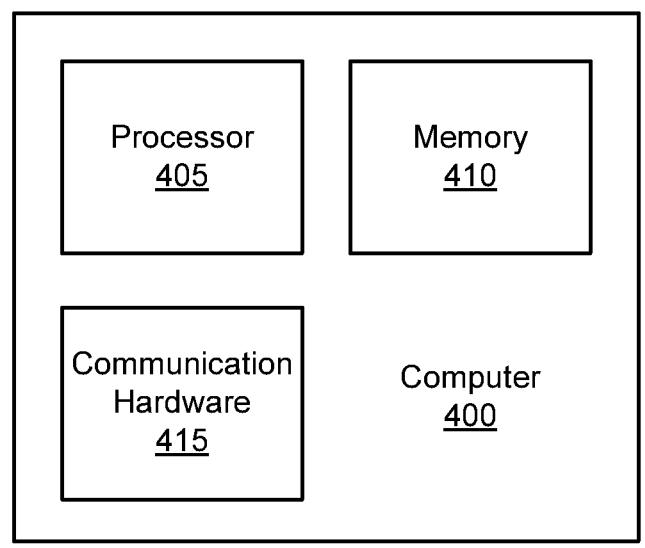
FIG. 4 is a schematic block diagram illustrating one embodiment of a computer.

FIG. 4 is a schematic block diagram illustrating one embodiment of a computer 400. The computer 400 may be embodied in the electronic device 100. Alternatively, the computer 400 may be embodied in a server in communication with the electronic device 100. In the depicted embodiment, the computer 400 includes a processor 405, a memory 410, and communication hardware 415. The memory 410 may be a semiconductor storage device, a hard disk drive, an optical storage device, a micromechanical storage device, or combinations thereof. The memory 410 may store code. The processor 405 may execute the code. The communication hardware 415 may communicate with other devices.

Figure 5A:
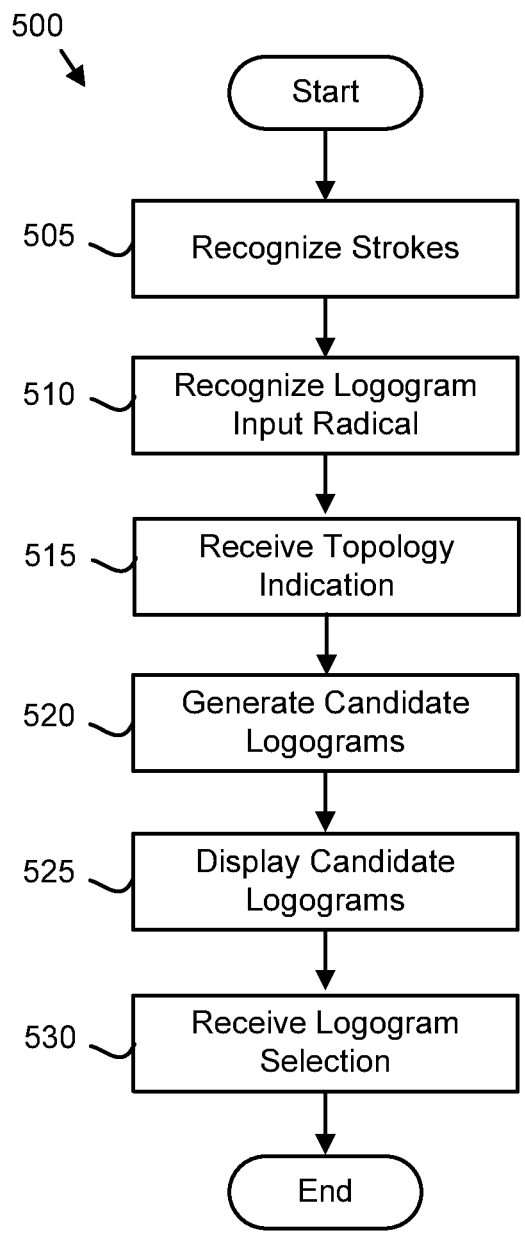
FIG. 5A is a schematic flow chart diagram illustrating one embodiment of a candidate logogram generation method.

FIG. 5A is a schematic flow chart diagram illustrating one embodiment of a candidate logogram generation method 500. The method 500 may generate candidate logograms. In addition, the method 500 may receive a logogram selection and enter the logogram selection on the electronic device 100. The method 500 may be performed by the processor 405. Alternatively, the method 500 may be performed by computer readable storage medium such as the memory 410. The computer readable storage medium may store code that when executed by the processor 405 performs the functions of the method 500.

The method 500 starts, and in one embodiment, the code may recognize 505 strokes 225 from handwritten strokes 125 of the logogram input 120. In one embodiment, the code recognizes the strokes 225 from the stroke order 235, the stroke direction 240, the stroke shape 245, the stroke length 250, and/or the stroke position 255 for each handwritten stroke 125. In addition, the code may assign a stroke index 260 in response to the stroke order 235, the stroke direction 240, the stroke shape 245, the stroke length 250, and/or the stroke position 255.

In one embodiment, the code recognizes 510 a logogram input radical from the logogram input 120. The recognition 510 of the logogram input radical is described in more detail in FIGS. 5B-C.

The code may further receive 515 a topology indication 330. A plurality of topology indications 330 may be displayed in response to the logogram input 120. The user may select the topology indication 330.

In one embodiment, the code generates 520 candidate logograms 360. The code may generate 520 candidate logograms 360 with strokes 225 matching the handwritten strokes 125 of the logogram input 120. In one embodiment, the code generates input strokes 225 from the handwritten strokes 125 and compares the input strokes 225 2 the strokes 225 of the logogram data 205.

In one embodiment, the code generates 520 the candidate logograms 360 in response to the logogram radicals 215 of the candidate logograms 360 matching the logogram input radical as illustrated in FIG. 3C. the code may recognize 510 the logogram input radical and generate 520 display candidate logograms 360 with logogram radicals 215 matching the logogram input radical in a logogram list 315.

Alternatively, the candidate logograms 360 may be generated 520 in response to the logogram radicals 215 of the candidate logograms 360 matching the logogram input radical and one or more second strokes 125*b* of the logogram input 120 matching strokes 205 of the candidate logograms 360 as illustrated in FIG. 3D.

In one embodiment, the generates 520 candidate logograms 360 that have strokes 225 matching the logogram input strokes 125 and topologies 265 matching the topology indication 330 as illustrated in FIG. 3F.

The code may further display 525 the candidate logograms 360. The candidate logograms 360 may be displayed in a logogram list 315. The user may make a selection of a logogram candidate 360. The code may receive 530 the logogram selection 320, the logogram selection 320 may be entered into the electronic device 100, and the method 500 ends.

Figure 5B:
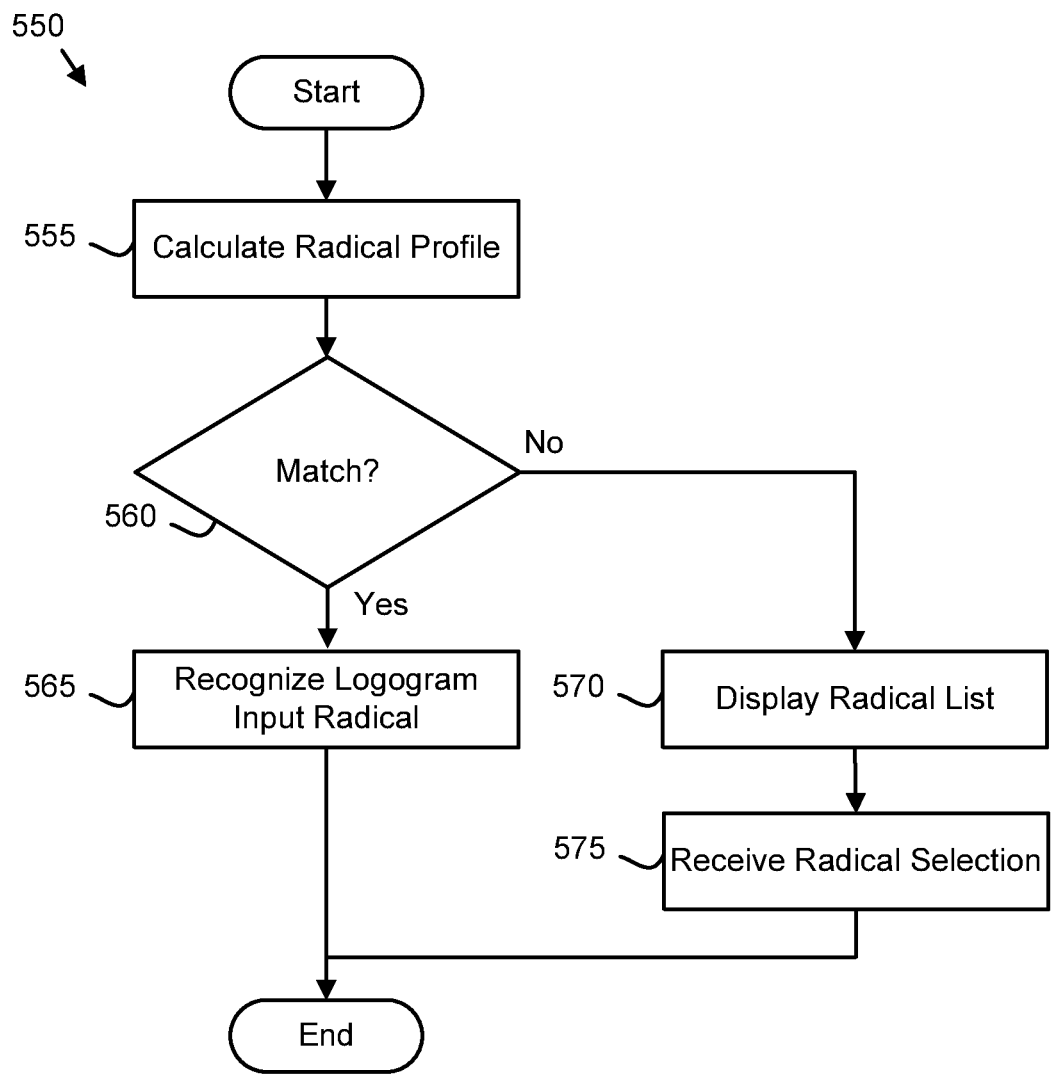
FIG. 5B is a schematic flow chart diagram illustrating one embodiment of a logogram input radical recognition method.

FIG. 5B is a schematic flow chart diagram illustrating one embodiment of a logogram input radical recognition method 550. The method 550 may be performed by the processor 405. Alternatively, the method 550 may be performed by computer readable storage medium such as the memory 410. The computer readable storage medium may store code that when executed by the processor 405 performs the functions of the method 550.

The method 550 starts, and in one embodiment, the code calculates 555 a radical profile from one or more first strokes of the logogram input 120. The radical profile maybe organized as radical data 260. The code may further determine 560 if the radical profile matches radical data 260 from the radical database 201. In one embodiment, the code compares strokes 225 of the radical profile with strokes 225 of the radical data 260. The recognition of strokes 225 is discussed in more detail in FIG. 5D. The radical profile may match radical data 260 if strokes 225 of the radical profile that are equivalent to strokes 225 of the radical data 260 exceed a match threshold.

If the radical profile matches the radical data 260, the logogram radical 215 of the radical data 260 is recognized 565 as the logogram input radical and the method 550 ends. If the radical profile does not match any of the radical data 260, the code may display 570 a radical list 305. The user may make a radical selection 310 from the radical list 305. The code may receive 575 the radical selection 310 as the logogram input radical and the method 550 ends.

Figure 5C:
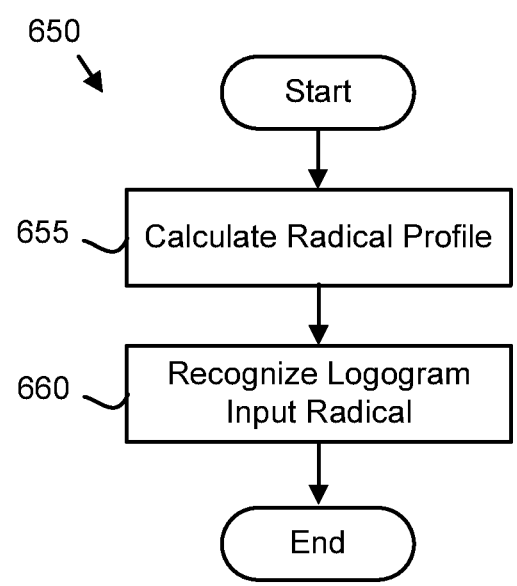
FIG. 5C is a schematic flow chart diagram illustrating one alternate embodiment of a logogram input radical recognition method.

FIG. 5C is a schematic flow chart diagram illustrating one alternate embodiment of a logogram input radical recognition method. The method 650 may be performed by the processor 405. Alternatively, the method 650 may be performed by computer readable storage medium such as the memory 410. The computer readable storage medium may store code that when executed by the processor 405 performs the functions of the method 650.

The method 650 begins, and in one embodiment, the code calculates 655 the radical profile. The code may calculate 655 the radical profile is described for step 555 of FIG. 5B.

In addition, the code may recognize 660 the logogram input radical as a logogram radical 215 in the radical data 260 with strokes 225 most closely corresponding to the strokes 225 of the radical profile and the method 650 ends.

Figure 5D:
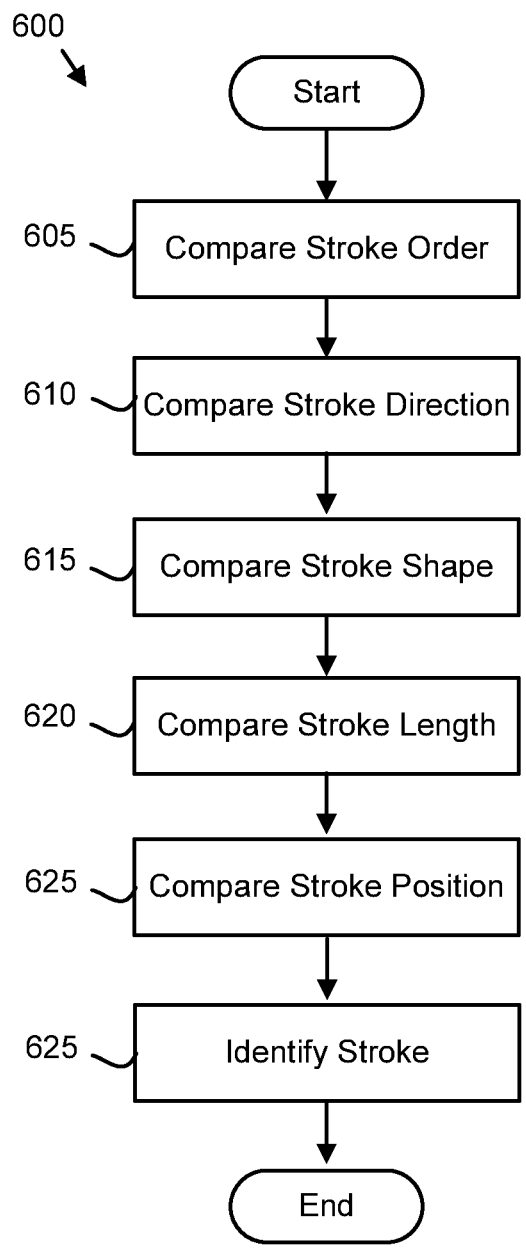
FIG. 5D is a schematic flow chart diagram illustrating one embodiment of a stroke recognition method.

FIG. 5D is a schematic flow chart diagram illustrating one embodiment of a stroke recognition method 600. The method 600 may be performed by the processor 405. Alternatively, the method 600 may be performed by computer readable storage medium such as the memory 410. The computer readable storage medium may store code that, when executed by the processor 405, performs the functions of the method 600.

The method 600 starts, and in one embodiment, the code compares 605 a stroke order 235 of a stroke 225 from a written stroke 125 with the stroke order 235 of a standard stroke 225 and/or a stroke 225 of radical data 260. In addition, the code may compare 610 a stroke direction 240 of the stroke 225 from the written stroke 125 with the stroke direction 240 of a standard stroke 225 and/or the stroke 225 of radical data 260.

The code may further compare 615 the stroke shape 245 of the stroke 225 from the handwritten stroke 125 with the stroke shape 245 of a standard stroke 225 and/or a stroke 225 of the radical data 260. In addition, the code may compare 620 the stroke length 250 of the stroke 225 from the written stroke 125 with the stroke length 250 of a stroke 225 of a standard stroke 225 and/or the radical data 260. In one embodiment, the code compares 625 the stroke position 255 of the stroke 225 from the written stroke 125 with the stroke position 255 of a standard stroke 225 and/or a stroke 225 of the radical data 260.

In one embodiment, the code recognizes 625 the stroke 225 as equivalent to the stroke 225 of the radical data 260 that is most similar to the handwritten stroke 125 and the method 600 ends. In one embodiment, the code calculates a score for each comparison. For example, the code may calculate an order score OS, a direction score DS, a shape score SS, a length score LS, and a position score PS, with each score expressing a difference between the characteristic of the handwritten stroke 125 and the stroke 225 of the radical data 260. The score may be larger with greater differences. In one embodiment, the code calculates a stroke score S using Equation 1, where k1-5 are nonzero constants.

$$S = k1*OS + k2*DS + k3*SS + k4*LS + k5*PS \quad \text{Equation 1}$$

The code may calculate a stroke score for each stroke 225 of the standard strokes 225 and/or the radical data 260. In one embodiment, the standard stroke 225 with the lowest stroke score may be identified. In addition, the radical data 260 with the lowest some of stroke scores may be identified as the logogram input radical.

The embodiments recognize strokes 225 of the logogram input 120 and generate one or more candidate logograms 360 with strokes 225 matching the handwritten strokes 125 of the logogram input 120 or logogram input strokes. In addition, the candidate logograms 360 may be generated based on the logogram input radical, the logogram input radical and one or more second strokes, and the logogram input strokes and the topology indication. As a result, the user that is unfamiliar with a logogram may still enter the logogram in the electronic device 100 by selecting one of the logogram candidates 260.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a graphical input that accepts logogram input;
    a display that displays the logogram input;
    a processor;
    a memory that stores code executable by the processor to:
        recognize one or more strokes of the logogram input for a logogram from the display;
        calculate radical profile from one or more first strokes of the logogram input;
        recognize the logogram input radical in response to the radical profile matching radical data;
        display a plurality of topology indications, wherein each topology indication of the plurality of topology indications indicates a space of a potential location of additional logogram input relative to the logogram input radical and the plurality of topology indications consist of an additional logogram input on a left topology indication, an additional logogram input on a right topology indication, an additional logogram input in a center topology indication, an additional logogram input in an upper right topology indication, and an additional logogram input in a lower right topology indication;
        receive a selection of a first topology indication of the plurality of topology indications at the graphical input that indicates the space of the additional logogram input relative to the logogram input radical; and
        generate one or more candidate logograms in response to both the logogram radicals of the candidate logograms matching the logogram input radical and topologies of the candidate logograms matching the first topology indication, wherein the topologies of the candidate logograms consist of the additional logogram input on the left topology indication, the additional logogram input on the right topology indication, the additional logogram input in the center topology indication, the additional logogram input in the upper right topology indication, and the additional logogram input in the lower right topology indication.

2. The apparatus of claim 1, wherein the strokes are recognized from one or more of a stroke order, a stroke direction, a stroke shape, a stroke length, and a stroke position.

3. The apparatus of claim 1, wherein the code is further executable by the processor to:
    display a radical list of candidate logogram radicals that match the one or more first strokes of the logogram input; and
    receive a selection of the logogram input radical.

4. A method comprising:
    recognizing, by use of a processor, one or more strokes of a logogram input for a logogram; and calculating radical profile from one or more first strokes of the logogram input;

recognizing the logogram input radical in response to the radical profile matching radical data;

displaying a plurality of topology indications, wherein each topology indication of the plurality of topology indications indicates a space of a potential location of additional logogram input relative to the logogram input radical and the plurality of topology indications consist of an additional logogram input on a left topology indication, an additional logogram input on a right topology indication, an additional logogram input in a center topology indication, an additional logogram input in an upper right topology indication, and an additional logogram input in a lower right topology indication;

receiving a selection of a first topology indication of the plurality of topology indications at a graphical input that indicates the space of the additional logogram input relative to the logogram input radical; and generating one or more candidate logograms in response to both the logogram radicals of the candidate logograms matching the logogram input radical and topologies of the candidate logograms matching the first topology indication, wherein the topologies of the candidate logograms consist of the additional logogram input on the left topology indication, the additional logogram input on the right topology indication, the additional logogram input in the center topology indication, the additional logogram input in the upper right topology indication, and the additional logogram input in the lower right topology indication.

5. The method of claim 4, wherein the strokes are recognized from one or more of a stroke order, a stroke direction, a stroke shape, a stroke length, and a stroke position.

6. The method of claim 4, the method further comprising:

displaying a radical list of candidate logogram radicals that match the one or more first strokes of the logogram input; and receiving a selection of the logogram input radical.

7. A program product comprising a non-transitory computer readable storage medium that stores code executable by a processor, the executable code comprising code to perform:

recognizing one or more strokes of a logogram input for a logogram;

calculating radical profile from one or more first strokes of the logogram input;

recognizing the logogram input radical in response to the radical profile matching radical data;

displaying a plurality of topology indications, wherein each topology indication of the plurality of topology indications indicates a space of a potential location of additional logogram input relative to the logogram input radical and the plurality of topology indications consist of an additional logogram input on a left topology indication, an additional logogram input on a right topology indication, an additional logogram input in a center topology indication, an additional logogram input in an upper right topology indication, and an additional logogram input in a lower right topology indication;

receiving a selection of a first topology indication of the plurality of topology indications at a graphical input that indicates the space of the additional logogram input relative to the logogram input radical; and generating one or more candidate logograms in response to both the logogram radicals of the candidate logograms matching the logogram input radical and topologies of the candidate logograms matching the first topology indication, wherein the topologies of the candidate logograms consist of the additional logogram input on the left topology indication, the additional logogram input on the right topology indication, the additional logogram input in the center topology indication, the additional logogram input in the upper right topology indication, and the additional logogram input in the lower right topology indication.

\* \* \* \* \*